United States Patent
Pfeffer et al.

(10) Patent No.: US 11,614,150 B2
(45) Date of Patent: Mar. 28, 2023

(54) BALL SCREW NUT AND METHOD FOR PRODUCING A BALL SCREW NUT

(71) Applicant: Schaeffler Technologies AG & Co. KG, Herzogenaurach (DE)

(72) Inventors: Claus Pfeffer, Gerhardshofen (DE); Richard Baier, Aurachtal (DE); Mario Kreutzer, Sonneberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/967,515

(22) PCT Filed: Jan. 25, 2019

(86) PCT No.: PCT/DE2019/100078
§ 371 (c)(1),
(2) Date: Aug. 5, 2020

(87) PCT Pub. No.: WO2019/158150
PCT Pub. Date: Aug. 22, 2019

(65) Prior Publication Data
US 2021/0088116 A1    Mar. 25, 2021

(30) Foreign Application Priority Data
Feb. 14, 2018  (DE) .................. 10 2018 103 218.8

(51) Int. Cl.
*F16H 25/22*  (2006.01)
*F16H 25/24*  (2006.01)

(52) U.S. Cl.
CPC ......... *F16H 25/2214* (2013.01); *F16H 25/24* (2013.01); *F16H 2025/2481* (2013.01)

(58) Field of Classification Search
CPC ................ F16H 25/2214; F16H 25/24; F16H 2025/2481; F16H 2025/249; F16H 2025/2233; F16H 2025/2228
See application file for complete search history.

(56) References Cited

U.S. PATENT DOCUMENTS

| | | | | |
|---|---|---|---|---|
| 3,689,124 A * | 9/1972 | Irwin | .................. | F16C 29/0688 384/43 |
| 3,719,979 A * | 3/1973 | Irwin | .................. | F16C 29/0688 384/43 |
| 3,831,460 A * | 8/1974 | Linley, Jr. | ........... | F16H 25/2009 74/441 |
| 3,918,777 A * | 11/1975 | Kitchin | ............... | F16C 33/3887 384/534 |
| 4,074,587 A * | 2/1978 | Brusasco | ............ | F16H 25/2427 74/424.77 |

(Continued)

FOREIGN PATENT DOCUMENTS

| | | |
|---|---|---|
| CN | 104813073 A | 7/2015 |
| DE | 2829433 C2 | 9/1986 |

(Continued)

*Primary Examiner* — Zakaria Elahmadi

(57) ABSTRACT

A ball screw nut for a ball screw drive includes a sleeve element which is formed as a sheet metal part and has a thread which is formed for the largest part as a load channel, wherein a relief section formed within the thread extends from the load channel at least slightly radially outwards and adjoins a deflection channel.

20 Claims, 15 Drawing Sheets

(56) References Cited

U.S. PATENT DOCUMENTS

| | | | |
|---|---|---|---|
| 4,612,817 A * | 9/1986 | Neff | F16H 25/2204 |
| | | | 74/424.86 |
| 5,749,265 A | 5/1998 | Namimatsu et al. | |
| 6,192,585 B1 * | 2/2001 | Buchanan, Jr. | B21D 53/24 |
| | | | 74/424.86 |
| 6,484,599 B2 * | 11/2002 | Blaurock | F16H 25/2427 |
| | | | 74/424.77 |
| 8,757,024 B2 * | 6/2014 | Singh | F16H 25/2228 |
| | | | 74/424.82 |
| 8,950,282 B2 * | 2/2015 | Babinski | F16H 25/2204 |
| | | | 74/424.82 |
| 10,978,100 B1 * | 4/2021 | Myers | G11B 33/121 |
| 11,365,630 B1 * | 6/2022 | Lighty | F01D 11/08 |
| 2011/0239799 A1 * | 10/2011 | Singh | F16H 25/2228 |
| | | | 74/424.86 |
| 2013/0298710 A1 * | 11/2013 | Kreutzer | F16H 25/2214 |
| | | | 74/424.86 |
| 2015/0033891 A1 * | 2/2015 | Sakaguchi | F16H 25/2204 |
| | | | 74/424.87 |
| 2017/0299026 A1 * | 10/2017 | Faber | F16H 25/2223 |

FOREIGN PATENT DOCUMENTS

| | | | | |
|---|---|---|---|---|
| DE | 10062982 A1 | 6/2002 | | |
| DE | 102009009851 A1 | 8/2010 | | |
| DE | 102014204562 A1 | 9/2015 | | |
| DE | 102014220725 A1 | 10/2015 | | |
| DE | 102014221135 B3 | 1/2016 | | |
| EP | 1281880 B1 | 6/2007 | | |
| JP | 2017032064 A | 2/2017 | | |
| WO | WO-2004099651 A1 * | 11/2004 | | F16H 25/2214 |

* cited by examiner

BALL SCREW NUT AND METHOD FOR PRODUCING A BALL SCREW NUT

CROSS-REFERENCE TO RELATED APPLICATIONS

This application is the U.S. National Phase of PCT Appln. No. PCT/DE2019/100078 filed Jan. 25, 2019, which claims priority to DE 10 2018 103 218.8 filed Feb. 14, 2018, the entire disclosures of which are incorporated by reference herein.

TECHNICAL FIELD

The disclosure relates to a ball screw nut suitable for use in a ball screw drive and to a method for producing a ball screw nut.

BACKGROUND

From DE 28 29 433 C2, a ball screw drive known as a helical gear is known. The known helical gear comprises an elongated screw part, that is, a threaded spindle, and a gear nut, which is constructed from an outer sleeve and an inner sleeve-like component. A ball rolling track is formed by the sleeve-like component. This component is provided with a plurality of through-holes into which ball return elements are inserted. The sleeve-like component has an essentially uniform wall thickness.

A ball screw drive disclosed in EP 1 281 880 B1 comprises a nut which comprises a spiral-shaped nut ball groove with a semicircular cross-section corresponding to a shaft groove of a shaft, that is a spindle. At least one section of the nut ball groove has a larger effective diameter than the other sections of the nut ball groove. If there is only one such section with an enlarged diameter, it is located centrally between the two end faces of the nut, that is a ball screw nut. If there are several sections with an enlarged diameter, these are uniformly distributed along the nut ball groove, whereby in no case does a section of the nut ball groove with an enlarged diameter adjoin an end face of the nut. In the area of the two end faces of the nut, the ball groove adjoins on a ball return, which is referred to in EP 1 281 880 B1 as a circulation element. This results in an external deflection of the ball screw drive.

Another ball screw drive, in which a ball groove of a ball nut does not have a uniform cross-section throughout, is described in DE 10 2009 009 851 A1. In this case, the ball groove of the ball nut is interrupted by at least one shoulder-free inner peripheral section of the ball nut. Several inner circumferential sections which are free in this way can be provided on the inner circumference of the ball nut before the ball groove is produced. The ball screw drive according to DE 10 2009 009 851 A1 is also a ball screw drive with external deflection. It is generally pointed out that an inlet section or outlet section can be formed between the ends of a deflection tube and the start of the load section of the ball screw drive, so that the balls entering or leaving are gradually loaded or unloaded.

DE 10 2014 221 135 B3 discloses a ball screw nut with a tubular sheet metal body which comprises a thread profile and is optionally extrusion-coated with plastic. The sheet metal body is composed of a sheet metal part describing the thread profile and a ball return piece inserted therein, designed as a further sheet metal part. Just like the ball screw drive known from DE 28 29 433 C2, it is therefore part of a ball screw drive with single deflection.

U.S. Pat. No. 5,749,265 A discloses a ball screw drive, the nut of which comprises a ball groove, the diameter of which changes continuously over the entire threaded nut viewed in the longitudinal direction of the spindle drive. In this way, an equalization of the introduction of force into the ball screw nut is to be achieved.

SUMMARY

It is desirable to develop a ball screw drive compared to the prior art both from a manufacturing perspective and in terms of mechanical strength and operational reliability to be considered in relation to the design effort.

The ball screw nut comprises a sleeve element in the form of a sheet metal part with a thread which is largely designed as a load section, a relief portion of the thread being an integral part of the sheet metal part and being at least slightly displaced radially outward in relation to the load channel and adjoining a deflection channel, which is also the one to which the ball screw nut is to be attributed. The relief portion, like the load section, is thus a section of the sleeve element that is produced by forming technology, the relief portion adjoining the load section in one piece. In contrast thereto, the deflection channel can be formed by a separate element, as is known in principle, for example, from DE 10 2014 221 135 B3. A joint between the thread of the ball screw nut and a separate deflection element is thus outside the load section.

The sleeve element can be rationally produced from a sleeve-shaped metal blank. In this case, the entire thread, that is to say both the load section and the relief sections adjacent thereto, is produced by forming technology, the relief sections being formed by molded or bent relief ramps. If recesses are provided for deflection elements, such recesses can also be made without producing chips or shavings, for example by cutting or punching or a combination of cutting and punching.

According to a first conception, the relief portion of the sleeve element is displaced radially outwards with respect to the rest of the thread by at least one incision extending in the direction of the thread, that is to say an incision extending along the helical ball groove. This concept can be realized through various designs.

According to a first possible design, the relief portion is delimited in both axial directions of the sleeve element by an incision of the type mentioned. In the area of the relief portion, the ball groove is thus formed by an at least slightly outwardly bent tongue, which connects seamlessly to the load section.

According to an alternative design, the thread in the relief portion is divided in the middle by a single incision extending in the longitudinal direction thereof. This means that the ball groove is at least slightly unfolded in the middle to create the relief portion.

In both designs, the outer diameter of the sleeve element in the area of the relief section is slightly enlarged compared to areas in which the load section is located. In the course of the production method, this can initially involve a more pronounced increase in diameter than in the final sleeve element.

According to a second possible concept, the sleeve element has no incision in the area of the relief section, but has a reduced wall thickness, the outer diameter of the entire sleeve element in this case, insofar as the thread is formed in the sleeve element, can be widened either uniformly or inconsistently, namely in the area of the relief section.

Both sleeve elements shaped according to the first concept and sleeve elements shaped according to the second concept are suitable for being inserted into an annular carrier part made of metal, which absorbs forces, that is to say supports the sleeve element. This applies in particular in cases in which a single deflection is formed by the deflection channel.

Forming the sleeve element from a metal blank with a hollow, cylindrical basic shape and assembling it with an annular carrier part to form a ball screw nut can comprise the following steps:

Provision of a preferably cylindrical metal blank and an annular carrier part, likewise made of metal, wherein the metal blank is a sheet metal part that is thin-walled compared to the carrier part, Generation of a sleeve element comprising a ball track by non-cutting shaping of a thread in the metal blank, wherein the thread is provided over the major part of the length thereof as a later load section of the ball screw nut and at least one end of the load section merges into a relief portion of the thread, which extends outwards at least slightly from the load section radial direction of the sleeve element, Insertion of the sleeve element into the annular carrier part, wherein the relief portion is forced inwards by the carrier part to such an extent that on the one hand the sleeve element with the outer wall thereof also lies within the area of the relief portion, as well as with the load section, on the carrier part and on the other hand the inside diameter of the wall of the sleeve element, formed as a thread, in the area of the relief portion remains enlarged compared to the load section.

Before the sleeve element is inserted into the annular carrier part, in a preferred process the sleeve element is subjected to a heat treatment. The sleeve element hardened in this way has sufficient rolling resistance in the thread. In addition, hardening of the sleeve element in the contact areas between the sleeve element and the carrier part can also be advantageous.

In a manner known per se, either one single deflection or a plurality of single deflections can be formed by the ball screw nut. The term single deflection means that, after having almost completely passed through a single turn, balls are guided back to the start of the turn by the deflection located in the ball screw nut. Compared to external deflections, single deflections are characterized by a particularly small space requirement in the radial direction of the ball screw drive.

By contrast, in the case of an external deflection, the number of turns through which a ball passes before it is returned by a deflection element is in principle not subject to any restrictions. If there is an external deflection in the present case, the deflection channel is formed, for example, by a separate element made of plastic. A frontal deflection of the rolling elements, i.e., balls, of the ball screw drive is also possible. In particular in the case of a frontal deflection or an outer deflection, not only a single-pass but also a multi-start design of the ball screw drive can be considered.

The carrier part, into which the sleeve element is inserted, can perform a wide variety of functions in addition to holding the sleeve element and absorbing forces. For example, a gearing is formed on the outer circumferential surface of the carrier part directly through this part or through a separate element, with which the ball screw nut can be used as a drive element of a ball screw drive. Depending on the type of gearing, the drive can take place, for example, by means of a belt drive or in the form of a spur gear. Additionally or alternatively, for example, a track for a roller bearing, in particular a ball bearing, can be located on the outer peripheral surface of the carrier part.

Depending on the application, instead of the ball screw nut, the threaded spindle can also act as a drive element of the ball screw drive, in which case the ball screw nut can be displaced linearly in a non-rotating manner within a surrounding construction.

BRIEF DESCRIPTION OF THE DRAWINGS

In the following, several exemplary embodiments are explained in more detail by means of a drawing. In the following.

DETAILED DESCRIPTION

Unless otherwise stated, the following explanations relate to all exemplary embodiments. Corresponding or basically equivalent parts are identified in all figures with the same reference symbols.

Figure 9:
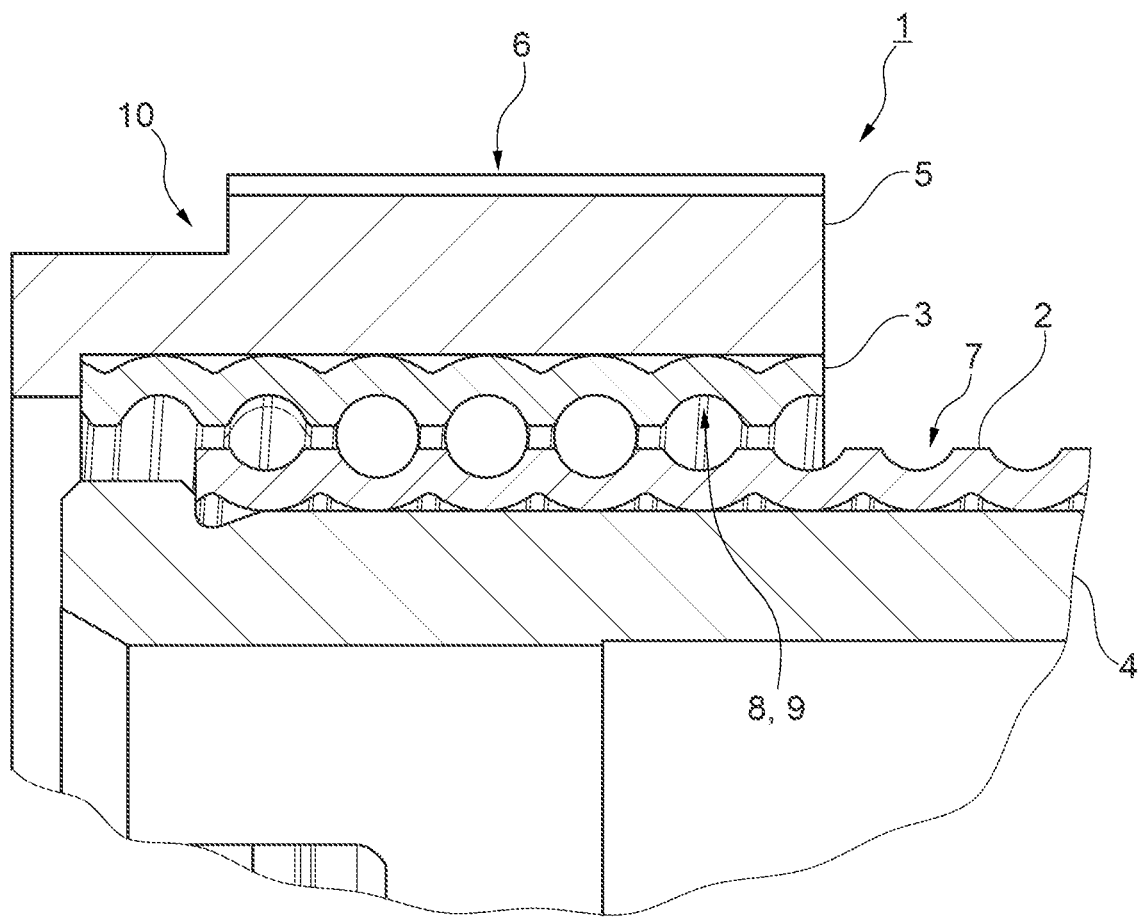
FIG. 9 shows a section of a ball screw drive including the ball screw nut according to FIG. 1.

A ball screw drive 1 comprises a threaded spindle 2 and a multi-part ball screw nut 10. Parts of the ball screw nut 10 are a sleeve element 3 and a carrier part 5, which supports the sleeve element 3. The sleeve element 3 is a sheet metal part. Optionally, the threaded spindle 2 is also designed as a sheet metal part, as outlined in FIG. 9. In this case, the threaded spindle 2 is supported by a tubular carrier part 4.

Threads of the ball screw drive 1 are designated 7 in the case of the threaded spindle 2 and 8 in the case of the ball screw nut 10. In the example according to FIG. 9, the torque transmission between the sleeve element 3 and the associated carrier part 5 takes place in a positive-fitting manner. In all of the exemplary embodiments, as can be seen from the figures, the threads 8 appear on the outer peripheral surface of the sleeve element 3, so that the wall thickness thereof is largely uniform, possibly with the exception of the relief sections 14.

Figure 17:
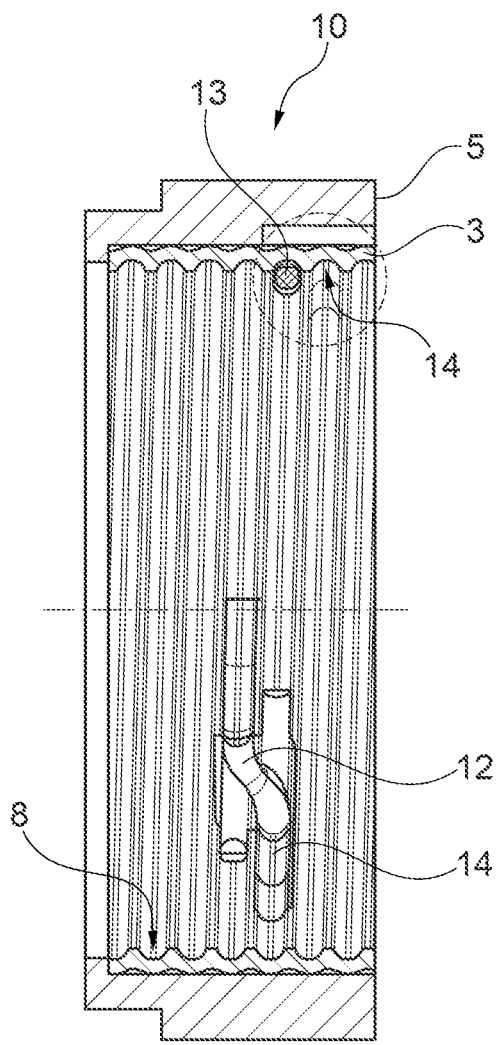
FIG. 17 shows a ball screw nut including sleeve element according to FIG. 15 in a view analogous to FIG. 1.

The threaded spindle 2 or the ball screw nut 10 can optionally act as a drive element of the ball screw drive 1. In the latter case, the carrier part 5 can comprise a gearing 6 according to FIG. 9, which enables a drive by means of a belt drive. Such a gearing 6 is optionally also present in the designs according to FIGS. 1, 10, and 17. The central axis of the ball screw drive 1, that is to say the axis of rotation of the threaded spindle 2 or of the ball screw nut 10, is denoted by M.

In all designs, the thread 8 formed by the sleeve element 3 comprises at least one load channel 9 and a plurality of relief sections 14. The load channel 9 extends over most of the thread 8. The relief sections 14 represent transitions between the load channel 9 and a deflection channel 11. The deflection channel 11 can be designed in the form of a single deflection 12 (FIGS. 1, 10, 12, 17), in the form of a frontal deflection (FIG. 13) or as an outer deflection (FIGS. 19 to 22). Brackets of the deflection channel 11 are identified with the reference symbol 13 in cases with single deflection 12. To accommodate the single deflections 12, the carrier part 5 comprises depressions 15, which are also referred to as clearances.

Figure 1:
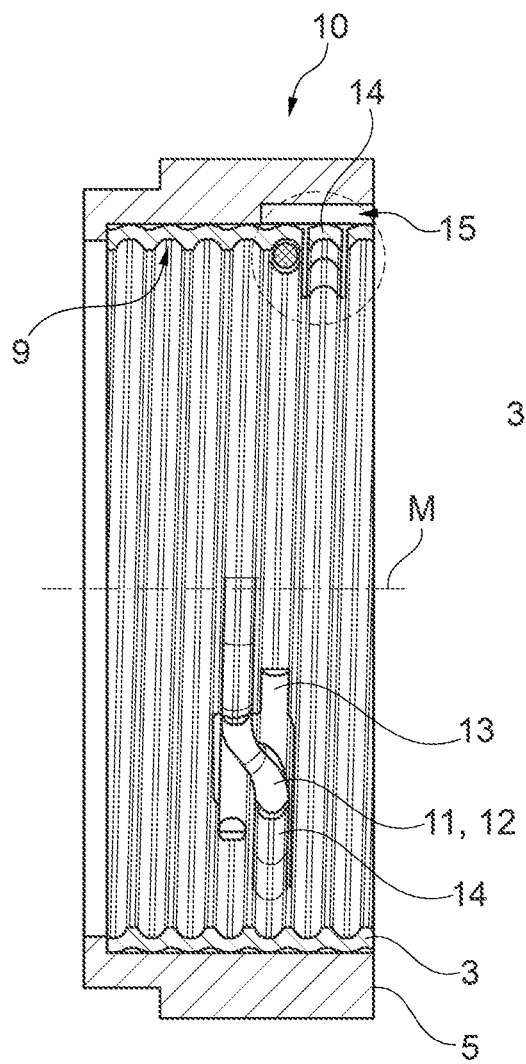
FIG. 1 shows a first exemplary embodiment of a multi-part ball screw nut.

In the embodiment according to FIG. 1, the relief sections 14 are formed by tongue-like sections of the thread 8 that run into a recess 21. If the sleeve element 3 is inserted into the carrier part 5, the relief portion 14 is located in a region of enlarged diameter denoted by 16 on the inner peripheral surface of the carrier part 5. Axially adjacent to the region 16 with an enlarged diameter is a cylindrical inner wall 17 with a diameter that is reduced in comparison to the region 16. A shoulder formed between the region 16 and the inner wall 17 is designated by 18.

Figure 2:
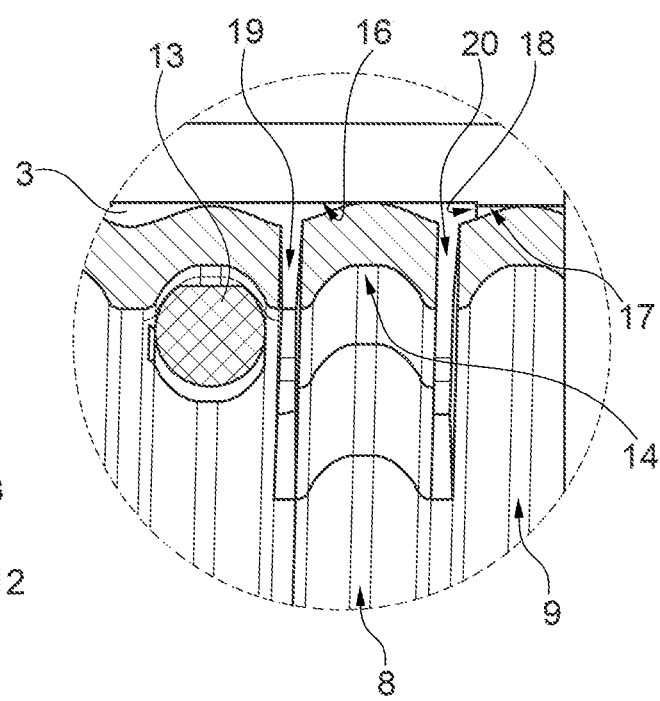
FIG. 2 shows a detail of the arrangement according to FIG. 1.

The relief portion 14 is separated from adjacent sections of the sleeve element 3 by incisions 19, 20, which can be seen, for example, in FIG. 2 and extend in the direction of the thread 8, that is to say essentially in the circumferential direction of the sleeve element 3. A radius difference between the outer wall of the relief section 14 and the outer wall of the adjacent section of the sleeve element 3, that is to say a section in which the load channel 9 is located, is denoted by dh. When the sleeve element 3 is shaped without producing chips or shavings, the relief portion 14 can initially be bent further outwards. The difference in radius, dh, is predetermined by the geometry of the carrier part 5 and occurs when the ball screw nut 5 is assembled. The radius difference dh is dimensioned such that when the ball screw drive 1 is operated, the rolling elements thereof, that is balls, are completely relieved in the relief sections 14. There are two relief sections 14 on each single deflection 12.

Figure 5:
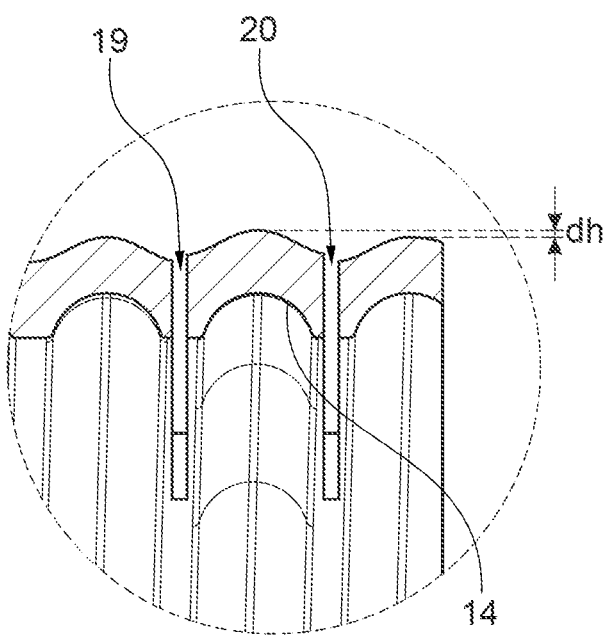
FIG. 5 shows a detail from FIG. 4.
Figure 6:
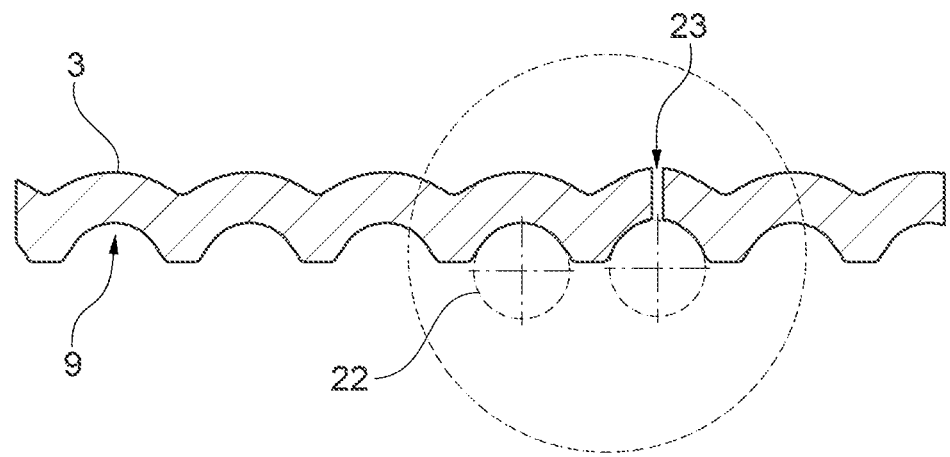
FIG. 6 shows a detail of an alternatively designed sleeve element for a ball screw nut.
Figure 7:
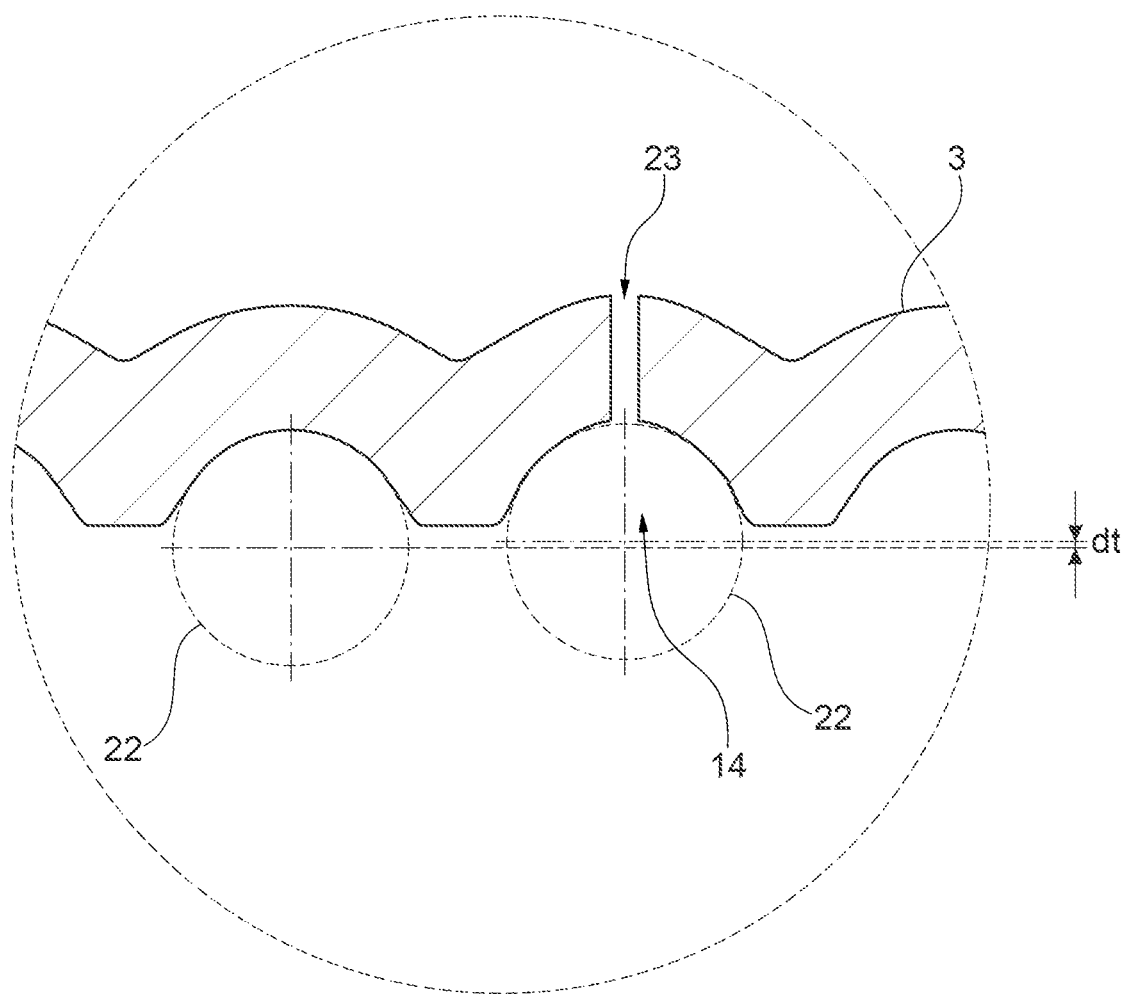
FIG. 7 shows a detail from FIG. 6.

In the exemplary embodiment according to FIG. 6, the relief portion 14 is formed by a single gap 23 extending in the longitudinal direction of the thread 8, that is an incision in the sleeve element 3. In this case, sections of the sleeve element 3 on both sides of the gap 23 are slightly bent outwards. As indicated in FIGS. 6 and 7, balls 22 rolling in the sleeve element 3 thus have additional space in the relief portion 14 compared to the load channel 9 in the radial direction of the ball screw drive 1. In FIG. 7, the pitch circle radius difference between balls 22 in a first thread of the load channel 9 and balls 22 in a second thread of the relief portion 14 are identified by dt. In terms of amount, dt corresponds approximately to the radius difference, dh, according to FIG. 5. The only single slotted shape of the relief sections 14, as shown in FIGS. 6 and 7, is particularly suitable for ball screw drives 1 with a narrow shoulder of the thread 8. For example, the ratio between thread pitch to ball diameter of the rolling elements 22 is less than 1.4.

Figure 3:
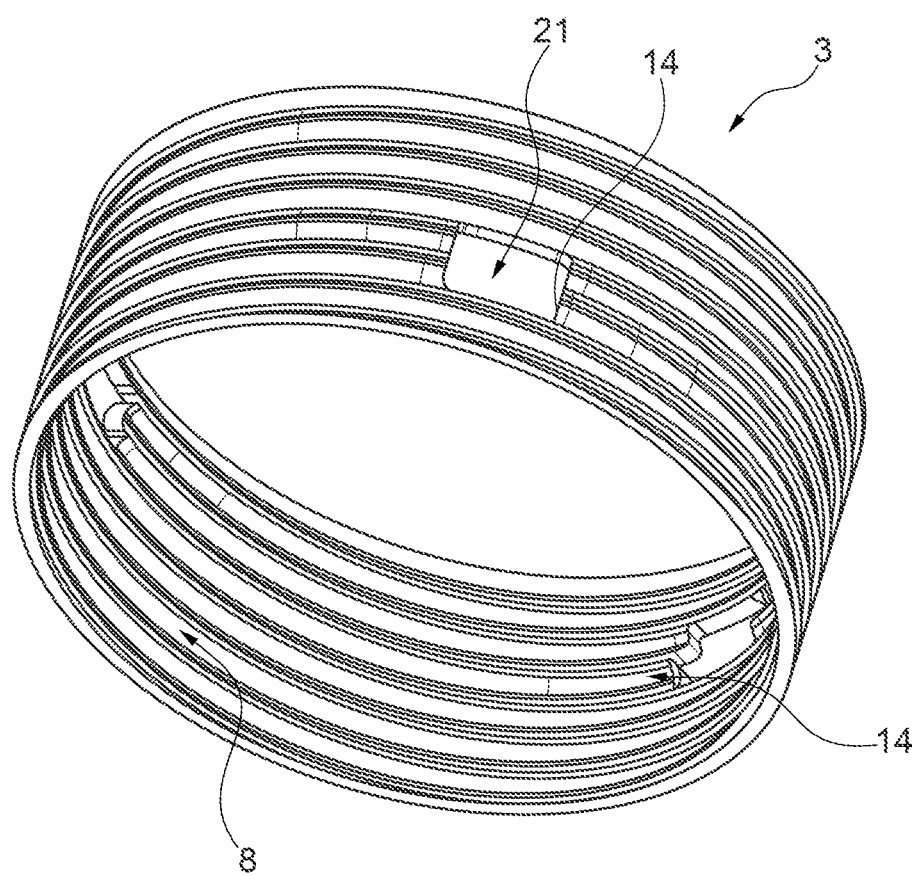
FIG. 3 shows a sleeve element of the ball screw nut according to FIG. 1 in a perspective view.
Figure 4:
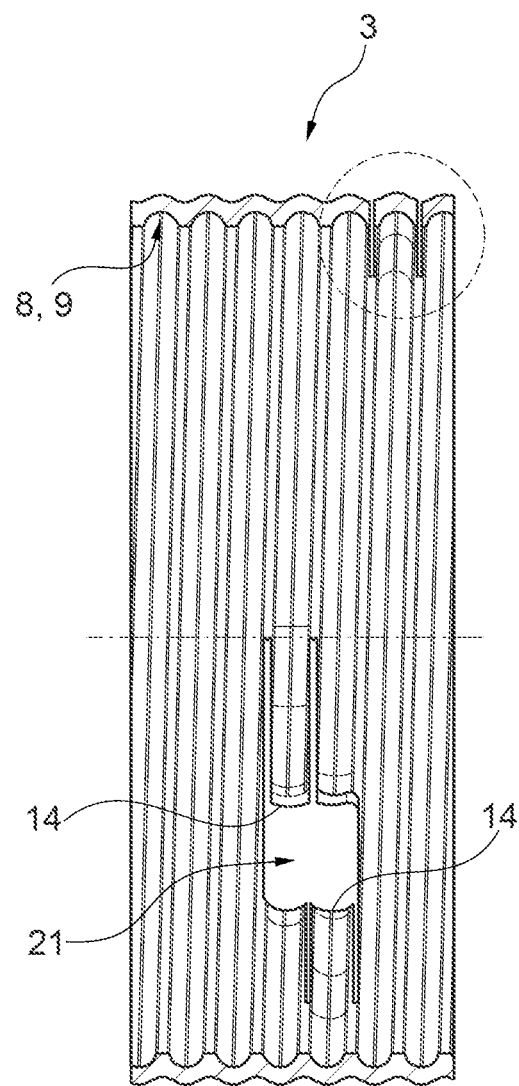
FIG. 4 shows the sleeve element according to FIG. 3 in a sectional view.
Figure 8:
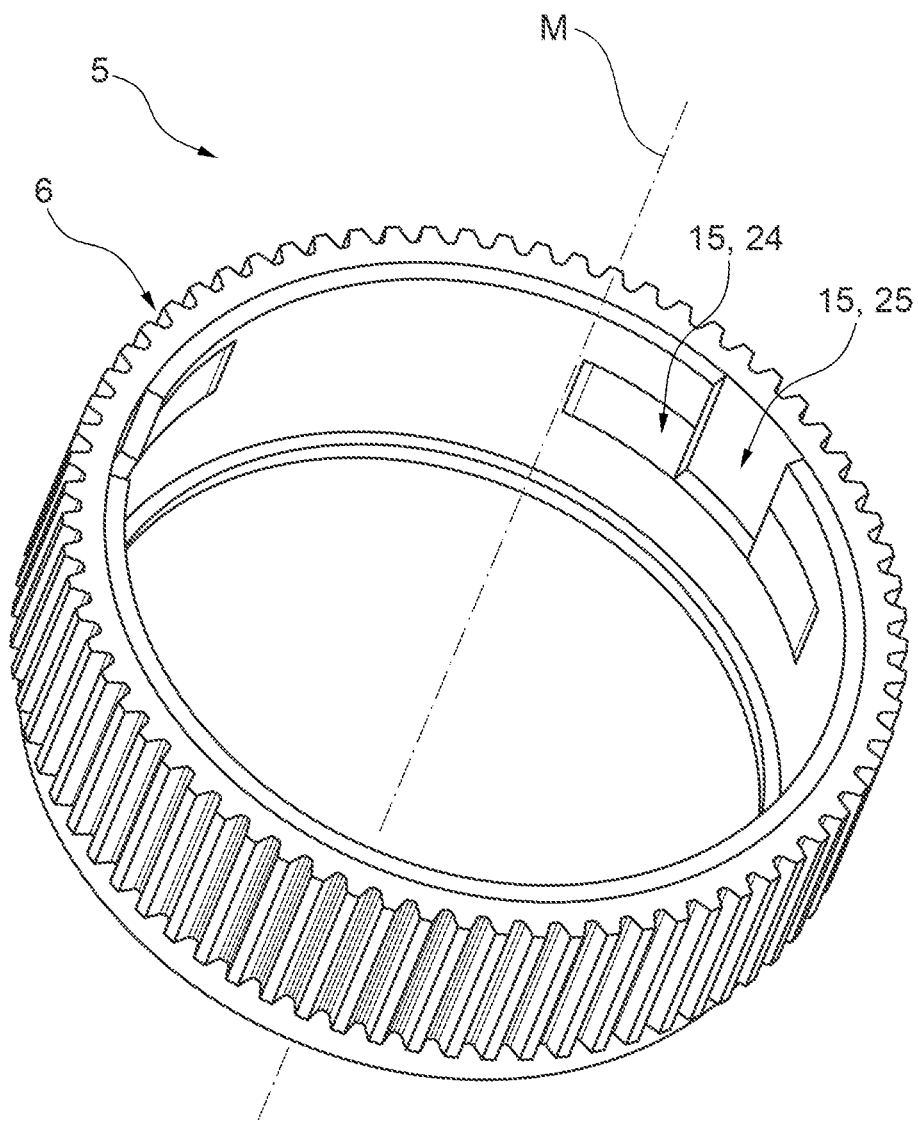
FIG. 8 shows a carrier part of the ball screw nut according to FIG. 1 in a perspective view.

The design of the carrier part 5 shown in FIG. 8 is suitable for receiving the sleeve element 3 according to FIG. 6. The multi-level design of depression 15 is clearly visible: The depression 15 is composed of two recesses 24 of the first type and a recess 25 of the second type, which lies in the circumferential direction between the recesses 24 of the first type and directly adjoins them. The recesses 24 of the first type have a significantly smaller depth than the recess 25 of the second type. Within the fully assembled threaded nut 10, the relief sections 14 lie in the recesses 24 of the first type on the inner circumference of the carrier part 5, while the deflection channel 11 is received in the recess 25. The carrier part 5 according to FIG. 8 is also suitable for receiving the sleeve element 3 according to FIG. 3. The carrier part 5 is made, for example, with machining from steel. It is also possible to manufacture the carrier part 5 as a sintered part.

Figures 10, 11:
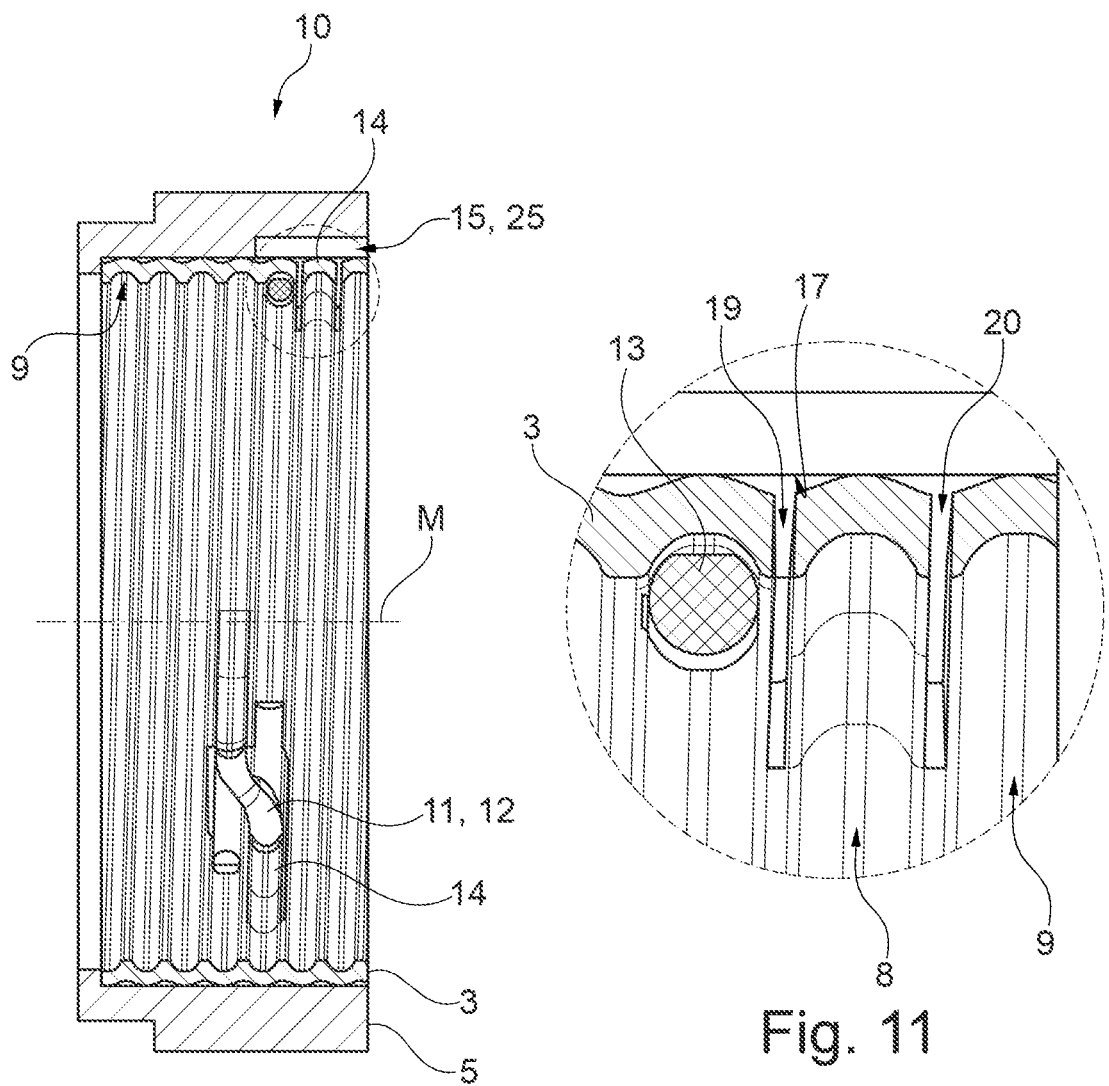
FIG. 10 shows an alternative embodiment of a ball screw nut in a view analogous to FIG. 1.
FIG. 11 shows a detail from the arrangement according to FIG. 10.
Figure 12:
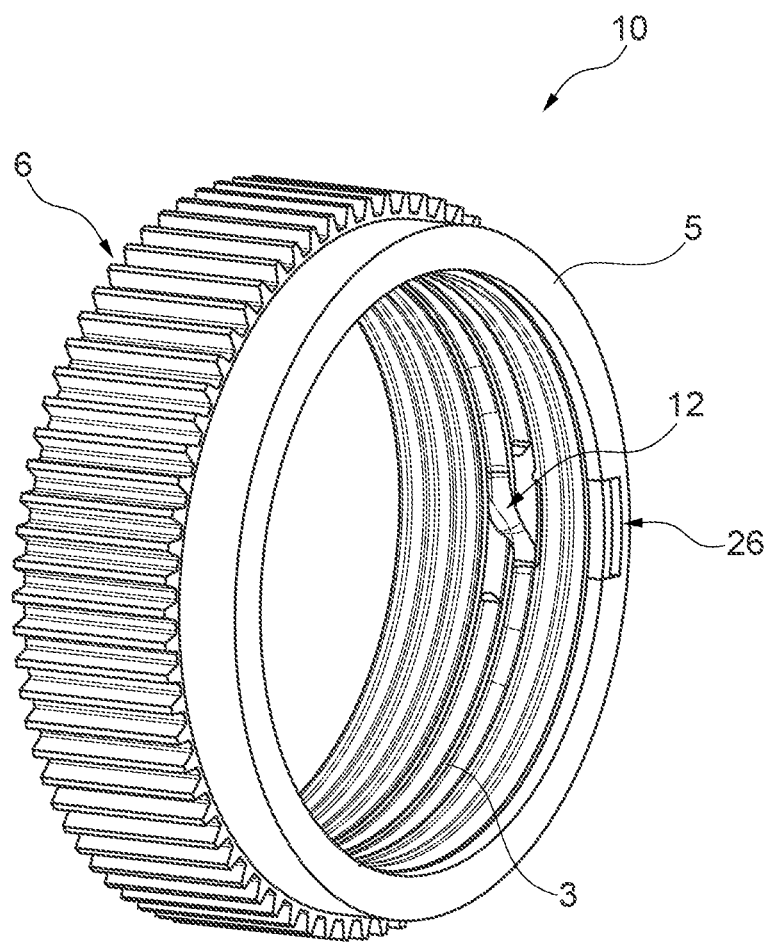
FIG. 12 shows a ball screw nut with positive-fit rotation lock between the carrier part and sleeve element.

FIG. 10 shows a design of the sleeve element 3, which differs from the designs explained above in that a uniform outer diameter is provided over the entire length of the sleeve element 3. The relief portion 14 is in this case given by a slightly reduced wall thickness of the sleeve element 3 in this region. Corresponding to the uniform geometry on the outer circumference of the sleeve element 3, the cylindrical inner wall 17 has a uniform inner diameter. The depressions 15, in which the single deflections 12 are accommodated, are excluded therefrom. Due to the reduced wall thickness, which is given in the relief sections 14, that is to say within the thread 8, the rolling elements (not shown in FIG. 11) roll in these sections 14, just as in the exemplary embodiment according to FIG. 7, by a pitch circle radius enlarged by the amount dt compared to the load channel 9.

The torque which is to be transmitted between the carrier part 5 and the sleeve element 3 during the operation of the ball screw drive 1 can in principle be absorbed either by a positive-fit connection or by a frictional connection between the parts 5, 3 mentioned. In the design according to FIG. 12, a form fit is provided on an end face of the ball screw nut 10 in the form of a rotation lock 26.

Figure 13:
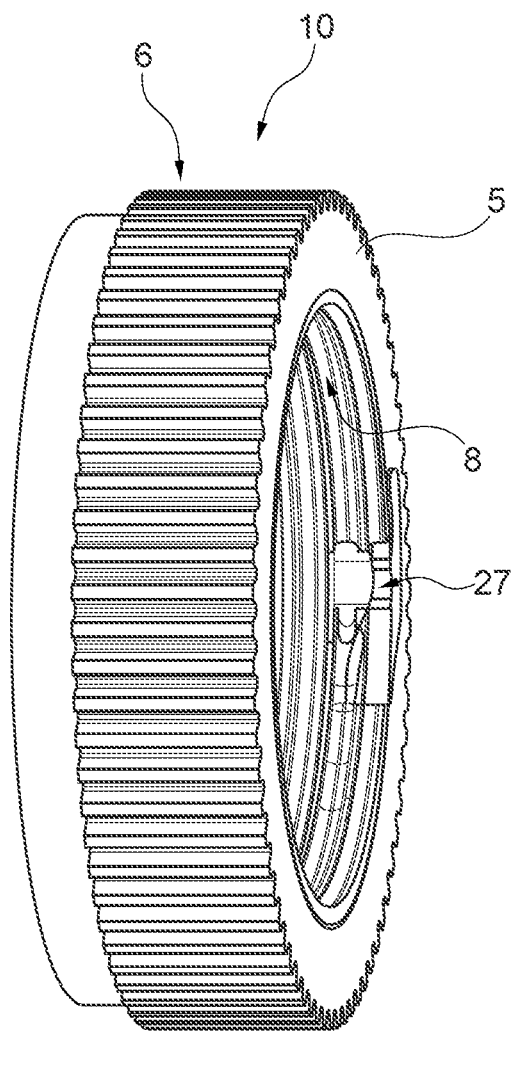
FIG. 13 shows a ball screw nut with frontal deflection.
Figure 14:
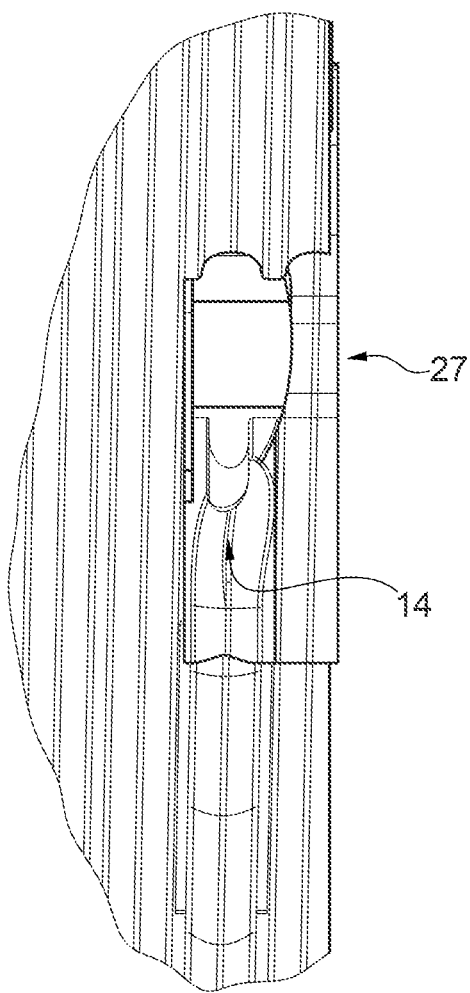
FIG. 14 shows a detail from the arrangement according to FIG. 13.

In the modified design according to FIG. 13, a frontal deflection 27 for returning the balls 22 can be seen on the end face of the ball screw nut 10.

Figures 15, 16:
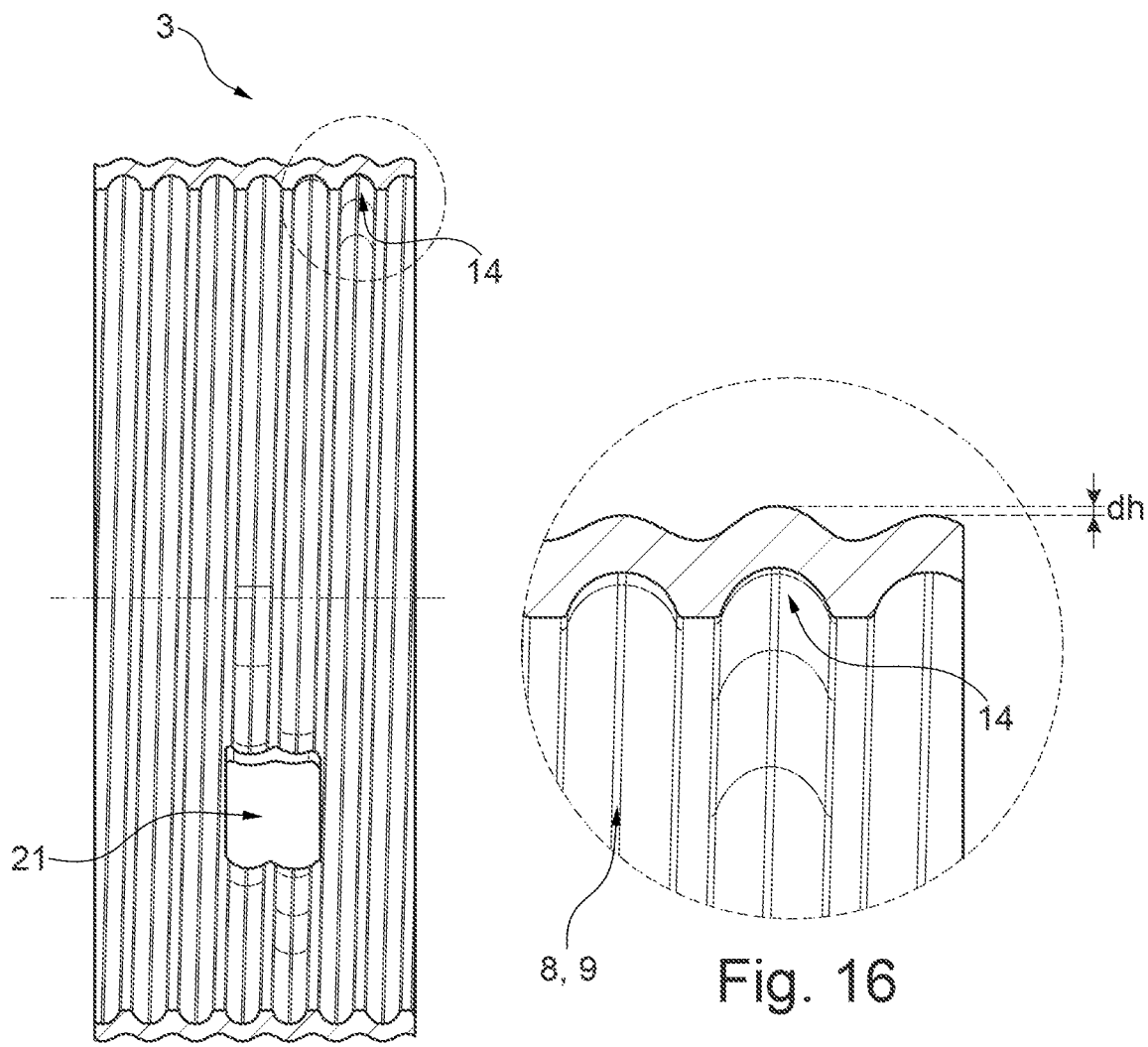
FIG. 15 shows a sleeve element of a ball screw nut, a relief portion being formed without an incision.
FIG. 16 shows a detail from FIG. 15.
Figure 18:
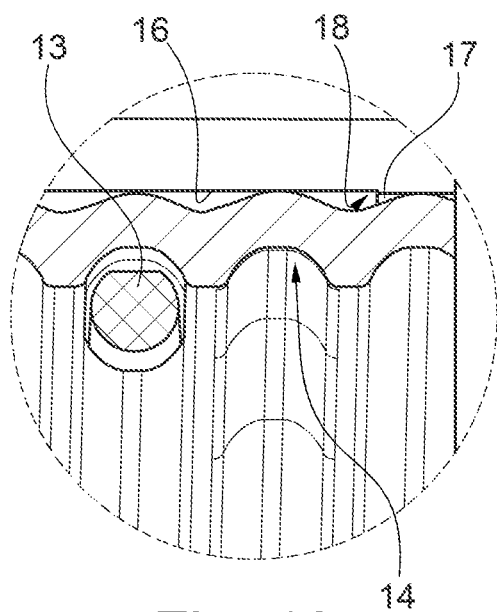
FIG. 18 shows a side view of the arrangement according to FIG. 17.

The design of the sleeve element 3 according to FIG. 15 has something in common with the designs according to FIGS. 1 and 6 in that an enlarged diameter of the sleeve element 3 is given in the area of the relief section 14. However, any gaps or incisions on or in the relief portion 14 are omitted in the design according to FIG. 15. Rather, an outer radius difference dh on the outer surface of the sleeve element 3, is produced exclusively by forming technology without destroying the closed surface of the sleeve element 3. Adapted to the expanded outer diameter in the area of the relief section 14, the carrier part 5 comprises a shoulder 18, as in the design according to FIG. 1, which can be seen in FIG. 18. The design of the sleeve element 3 according to FIG. 15 is particularly suitable for ball screw drives 1 in which the ratio between the thread pitch and the diameter of the rolling elements 22 is greater than 1.4. Unintended deformation of a load channel 9 during the machining of the relief sections 14 can be excluded with a particularly high probability given this minimum ratio between the thread pitch and the rolling element diameter.

FIGS. 19 to 22 show exemplary embodiments of ball screw drives 1 with external deflection. External deflection pieces 28 provided for this purpose and forming an overall ring shape are made of plastic and are each constructed in several parts. The deflection channel 11 located in the outer deflection pieces 28 bridges a plurality of turns of the threads 7, 8 in a manner known per se.

Figure 19:
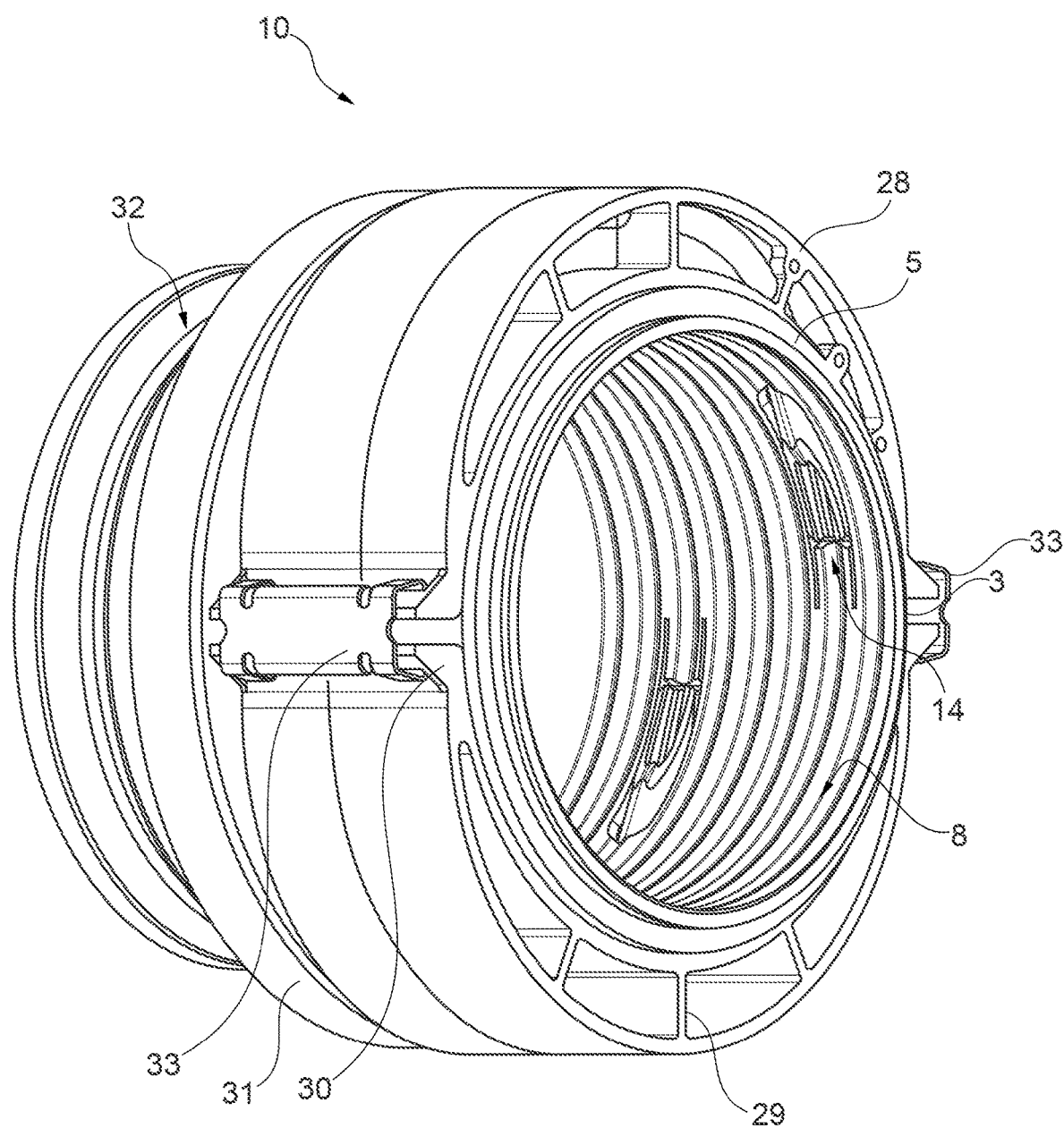
FIG. 19 shows a ball screw nut with external steering in a perspective view.

In FIG. 19 can be seen stiffening ribs 29 of the outer deflection pieces 28 and holding contours 30, which are likewise formed by the outer deflection pieces 28. Brackets 33 are held on the holding contours, which hold the multi-part outer deflection pieces 28 together.

In each of the designs according to FIGS. 19 to 22, a flange 31 and a ball track 32 are formed by the carrier part 5. A drive wheel can be attached to flange 31, for example. Rolling elements of a ball bearing (not further shown) roll on the ball track 32 which is used to support the ball screw nut 10 in a surrounding construction.

Figure 20:
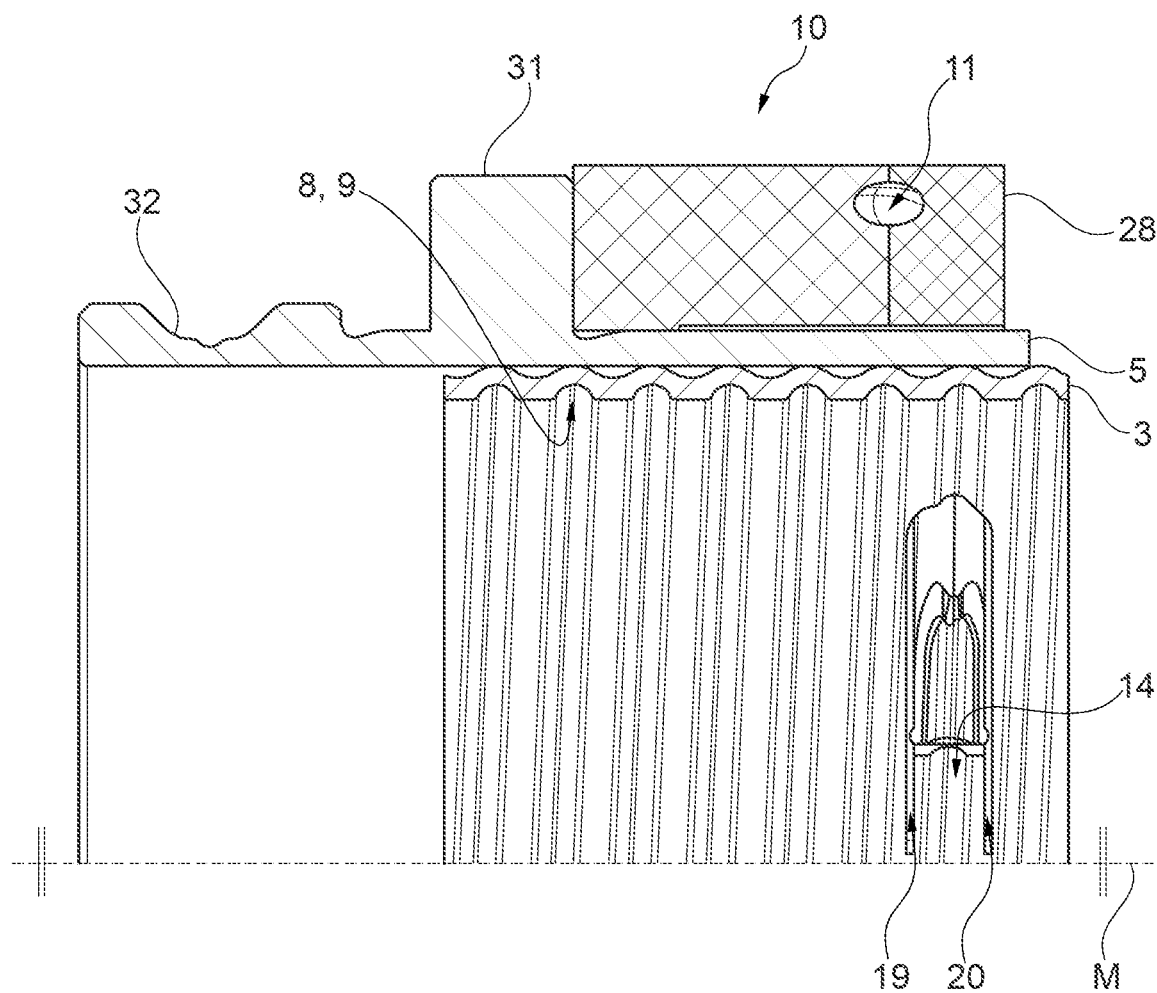
FIG. 20 shows a side view of the arrangement according to FIG. 19.
Figure 21:
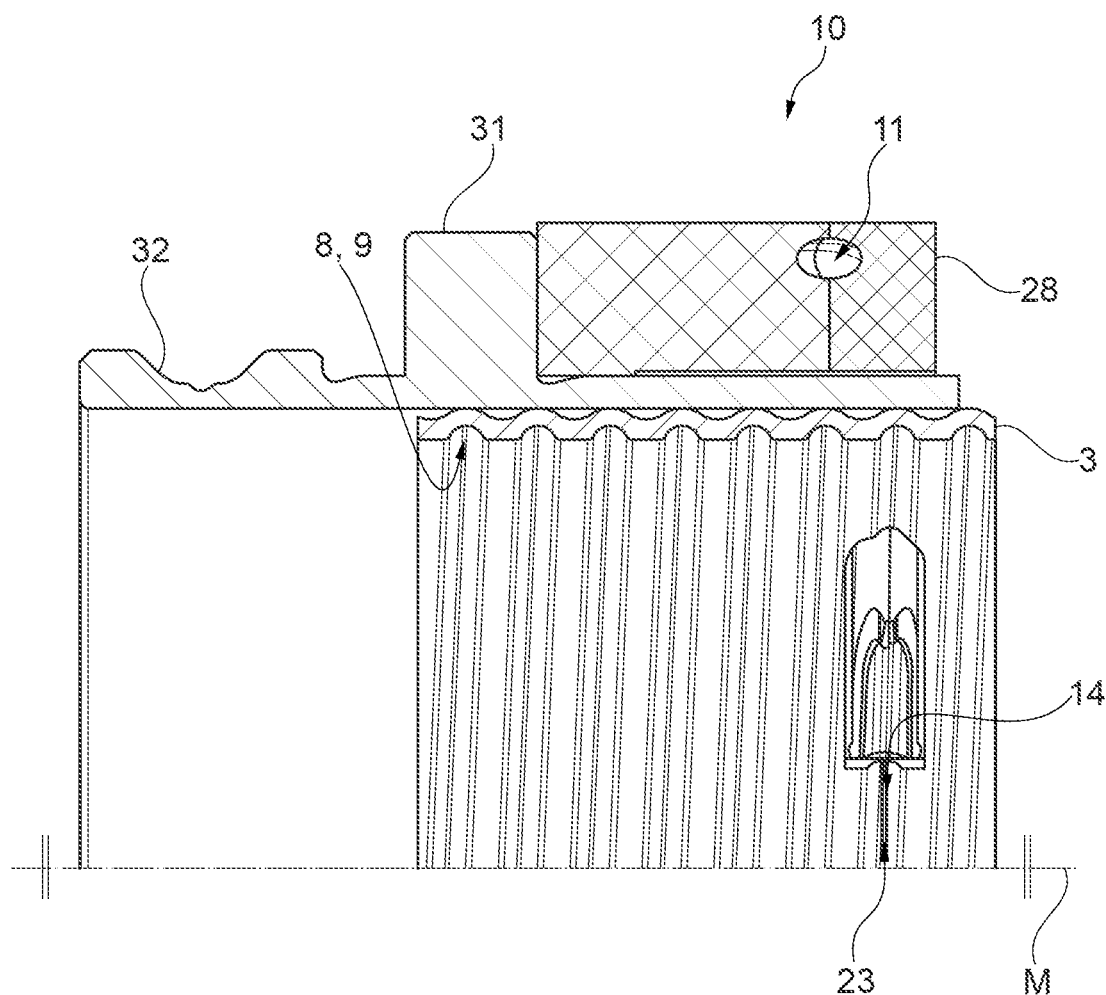
FIG. 21 shows a ball screw nut with external deflection and a sleeve element corresponding to FIG. 6.
Figure 22:
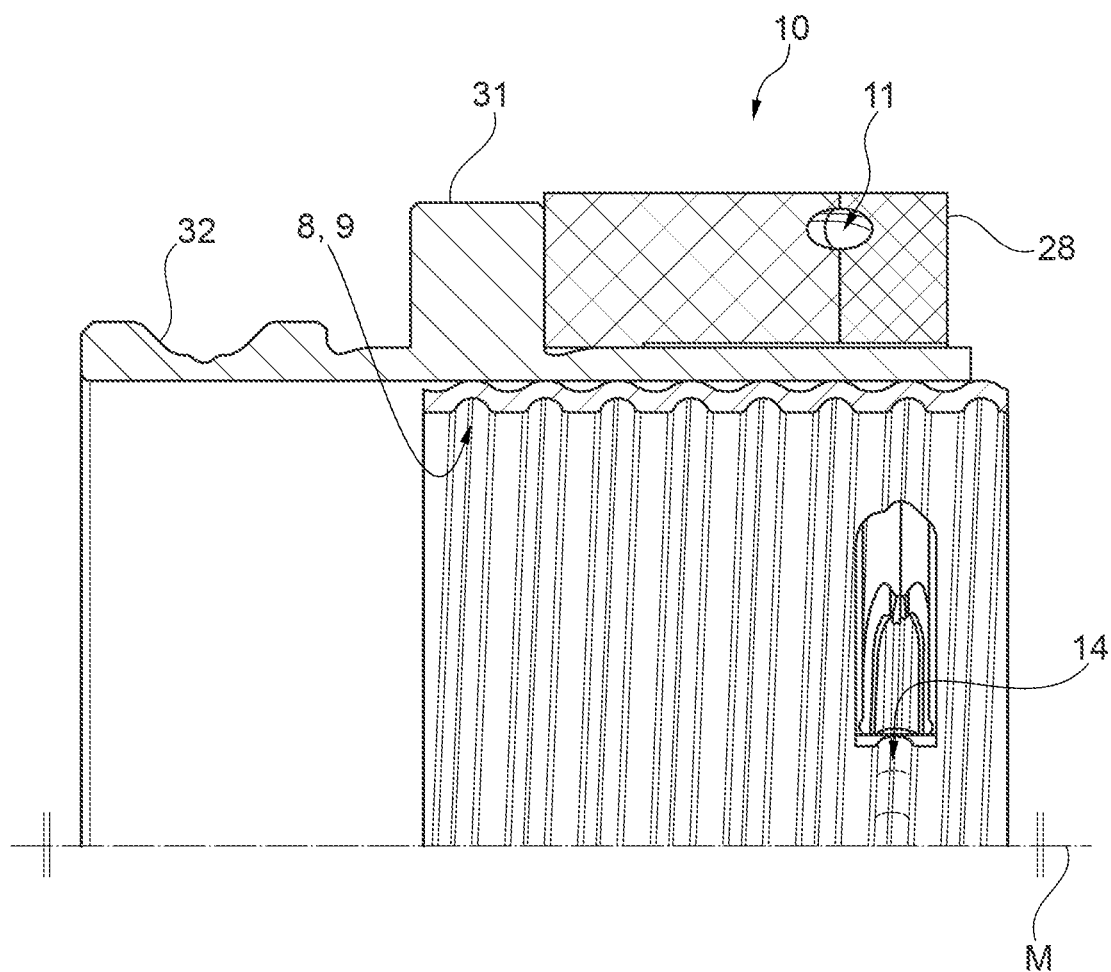
FIG. 22 shows a ball screw nut with external deflection and a sleeve element corresponding to FIG. 15.

In the design according to FIG. 20, incisions 19, 20 can be seen on both sides of the relief section 14, as already described in connection with FIG. 1. The design according to FIG. 21 with a central incision 23 in the relief portion 14 corresponds to the variant according to FIG. 6. According to FIG. 22, on the other hand, the relief portion 14 is free of gaps or incisions, as already described in connection with FIGS. 17 and 18.

LIST OF REFERENCE SYMBOLS

1 Ball screw drive
2 Threaded Spindle
3 Sleeve element
4 Carrier part of the threaded spindle
5 Carrier part of the spindle nut
6 Gearing
7 Thread of the threaded spindle
8 Thread of the spindle nut
9 Load channel, load section
10 Ball screw nut
11 Deflection channel
12 Single deflection
13 Single deflection mount
14 Relief section
15 Depression
16 Extended diameter range
17 Cylindrical inner wall
18 Shoulder
19 Incision
20 Incision
21 Recess in the sleeve element
22 Ball, rolling elements
23 Gap, incision
24 First type of recess
25 Second type of recess
26 Rotation lock
27 Frontal deflection
28 External deflection piece
29 Stiffening rib
30 Holding contour
31 Flange
32 Ball track
33 Bracket
dh Outer radius difference of the sleeve element
dt Pitch radius difference
M Central axis

The invention claimed is:

1. A ball screw nut for a ball screw drive, comprising:
a sheet metal sleeve element with a thread having a load channel and a relief portion, the relief portion configured to be displaced radially outwards from an adjacent thread portion via at least one incision extending in a direction of the thread, and
the relief portion configured as a transition portion between the load channel and a deflection channel such that a first end of the relief portion is connected to the load channel, and a second end of the relief portion is connected to the deflection channel.

2. The ball screw nut according to claim 1, wherein the relief portion is displaced radially outwards via bending of the relief portion.

3. The ball screw nut according to claim 1, wherein the relief portion is delimited in both axial directions of the sleeve element by an incision of the at least one incision.

4. The ball screw nut according to claim 2, wherein the relief portion is divided in the middle by a single incision.

5. The ball screw nut according to one claim 1, wherein the relief portion adjoins the deflection channel.

6. The ball screw nut according to claim 5, wherein the sleeve element is inserted into an annular carrier part on an inner peripheral surface of which are formed recesses of a first type into which engages the sleeve element in a region of the relief portion, as well as at least one recess of a second type adjoining the recesses of the first type, which recess is deeper than the recesses of the first type and is designed to receive the deflection channel.

7. The ball screw nut according to claim 1, wherein the deflection channel is configured as part of an outer deflection and is formed by a separate element made of plastic.

8. The ball screw nut according to claim 1 wherein the deflection channel is configured as part of a frontal deflection.

9. The ball screw nut according to claim 1, wherein the sleeve element has a reduced wall thickness in a region of the relief portion.

10. A method of producing a ball screw nut, comprising:
providing a metal blank and an annular carrier part,
generating a sleeve element comprising a ball track by shaping a thread in the metal blank, the thread being formed over a majority of a length thereof as at least one load channel and one end of one of the at least one load channel merging into a relief portion, the relief portion displaced outwards from the load channel in a radial direction of the sleeve element via at least one incision, and
inserting the sleeve element into the annular carrier part, the relief portion being forced inwards by the carrier part to such an extent that the sleeve element with an outer wall thereof also lies within an area of the relief portion, as well as with the one of the at least one load channel, on the carrier part and, an inside diameter of a wall of the sleeve element shaped as a thread remains enlarged in the area of the relief portion compared to the one of the at least one load channel, and
wherein the relief portion is configured as a transition portion between the one of the at least one load channel and a deflection channel such that a first end of the relief portion is connected to the one of the at least one load channel, and a second end of the relief portion is connected to the deflection channel.

11. The method of claim 10 wherein the thread is formed in the metal blank via a process that does not produce shavings or chips.

12. A ball screw nut for a ball screw drive, comprising:
a sheet metal sleeve element with a thread having:
a load channel having a first thread configured to engage a ball in a first position defined by a first pitch circle radius; and
a relief portion having a second thread axially adjacent to the first thread, the second thread configured to engage the ball in a second position defined by a second pitch circle radius greater than the first pitch circle radius; and
a deflection element, and
the relief portion configured as a transition portion between the load channel and the deflection element such that a first end of the relief portion is connected to the load channel, and a second end of the relief portion is connected to the deflection element.

13. The ball screw nut according to claim 12, wherein the relief portion is displaced radially outwards with respect to the load channel via an incision extending in a direction of the thread.

14. The ball screw nut according to one claim 12, wherein the deflection element is part of a single deflection.

15. The ball screw nut according to claim 12, wherein the deflection element is part of an outer deflection and is made of plastic.

16. The ball screw nut according to claim 12, wherein the deflection element is part of a frontal deflection.

17. The ball screw nut according to claim 12, wherein the second thread has a reduced wall thickness relative to the first thread.

18. The ball screw nut of claim 1, wherein an outer diameter of the sleeve element is enlarged in a region of the relief portion.

19. The ball screw nut of claim 12, wherein the second thread has an expanded second outer diameter relative to a first outer diameter of the first thread.

20. The method of claim 10, wherein the relief portion is displaced outwards via bending of the relief portion.

* * * * *